United States Patent [19]

Nagata et al.

[11] 4,216,675
[45] Aug. 12, 1980

[54] TEMPERATURE DETECTING DEVICE

[75] Inventors: Kunio Nagata; Yasuo Ohashi, both of Kyoto, Japan

[73] Assignee: Omron Tateisi Electronics Co., Kyoto, Japan

[21] Appl. No.: 28,858

[22] Filed: Apr. 10, 1979

[30] Foreign Application Priority Data

Apr. 29, 1978 [JP] Japan ................... 53/51177

[51] Int. Cl.³ ............................................. G01K 7/18
[52] U.S. Cl. ............................. 73/362 AR; 324/65 R; 324/115; 324/DIG. 1
[58] Field of Search ................. 73/362 AR; 364/557; 324/65 R, DIG. 1, 115

[56] References Cited

U.S. PATENT DOCUMENTS 3,447,075  5/1969  Williams, Jr. et al. ......... 73/362 AR
3,722,283  3/1973  Treharne et al. ............... 73/362 AR

*Primary Examiner*—Donald O. Woodiel
*Attorney, Agent, or Firm*—Stevens, Davis, Miller & Mosher

[57] ABSTRACT

A temperature detecting device which comprises an electrical bridge circuit including four arms, a temperature responsive resistance contained in one of the arms, a resistance type potential divider having at least one intermediate terminal which represents an output terminal of the network, and switching means connected across two power source terminals thereof for inverting the connection of the potential divider in accordance with a temperature state, positive or negative, which is detected by said device, the respective divided portion divided by the intermediate terminal forming two arms of the network.

9 Claims, 2 Drawing Figures

TEMPERATURE DETECTING DEVICE

BRIEF SUMMARY OF THE INVENTION

This invention relates to an improvement for a temperature detecting device having an electrical bridge network, and more particularly to a temperature detecting device which includes a temperature responsive resistance applicable to an arm of the bridge network and a switching member for inverting the connection of a resistance forming a portion of the bridge network.

Temperature detecting devices are well known which include an electrical bridge network having an arm containing a temperature responsive resistance, an arm containing a reference resistance, and an arm containing a variable resistance for balancing the output condition of the network. In a digital mode, the variable resistance comprises a movable intermediate terminal and a plurality of interconnecting taps which are connected to the same in predetermined spaced relation so that one of the taps may be selectably connected to the intermediate terminal. In an analog mode, the variable resistance has a slidable intermediate terminal which is slidably connected to the resistance.

Thus, as the temperature responsive resistance is subjected to varying temperatures, the resistance thereof changes, the variable resistance being capable of being adjusted to provide a balance condition in the bridge network. When a temperature must be detected in a wide range, especially over positive and negative temperatures, such devices have the disadvantage that the variable resistance must vary over a wide range or have many interconnecting taps corresponding to a predetermined temperature calibration with a complicated associated circuit.

It is, therefore, a primary object of this invention to provide a temperature detecting device having a simplified construction capable of detecting a temperature in a range over positive and negative temperatures with ease of operation.

It is a further object of this invention to provide a convenient temperature detecting device for detecting a predetermined temperature including a digital presetting means for presetting an absolute numerical of the predetermined temperature on the decimal basis from "0" to "99" and a switching means for selectably inverting a temperature range between positive and negative degrees for presetting the temperature, which is capable of easily and quickly changing the preset temperature between a negative and a positive temperature.

It is another object of this invention to provide a temperature detecting device having an electrical bridge network including a temperature responsive resistance employed in one arm of the network which comprises means for correcting the balance condition of the output of the network in response to the non-linear resistance characteristics of the temperature responsive resistance.

According to one aspect of this invention, there is provided a temperature detecting device which comprises an electrical bridge circuit including four arms, a temperature responsive resistance contained in one of the arms, a resistance type potential divider having at least one intermediate terminal which represents an output terminal of the network, and switching means connected across two power source terminals thereof for changing the connection of the potential divider in accordance with a temperature state, positive or negative, which is detected by said device, the respective divided portion divided by the intermediate terminal forming two arms of the network.

BRIEF DESCRIPTION OF THE DRAWINGS

These and other objects and numerous advantages of the temperature detecting device according to this invention will become apparent from the following detailed description of this invention taken in conjunction with the accompanying drawings, in which.

DETAILED DESCRIPTION

Figure 1:
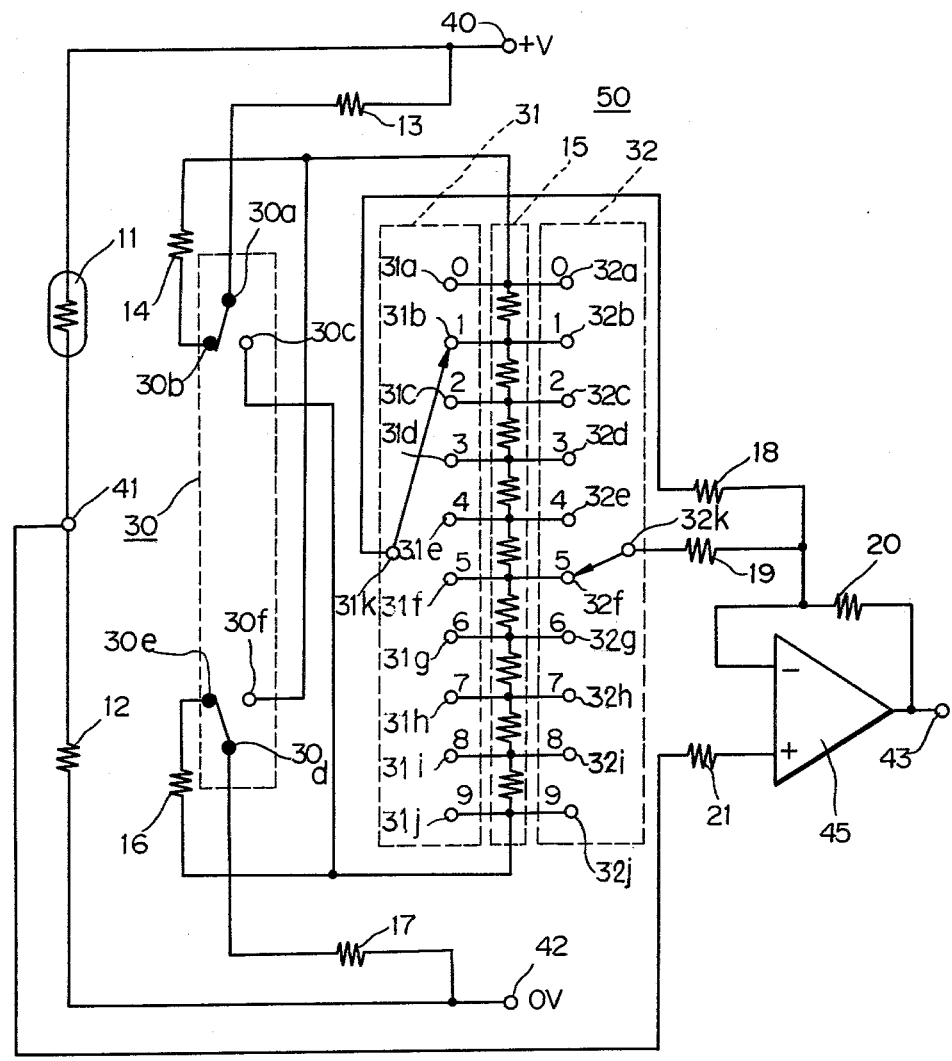
FIG. 1 is a schematic diagram showing a temperature detecting device in one embodiment one of this invention.

FIG. 1 shows one embodiment of the temperature detecting device, in which the temperature "+15° C." is preset as a detected temperature. A temperature responsive resistance 11, such as a platinum resistance element or the like, and a reference resistance 12 are connected in series with a voltage source between terminals 40 and 42 which form a first and a second arm of a bridge network, respectively. A switch 30 for selectably changing the temperature range between negative and positive is a double-pole double-throw switch or the like, a common terminal 30a of which is connected to a resistance 13 and a contact 30b of which is connected to one end of a resistance 14. The other end of the resistance 14 is connected to one end of a resistance type potential divider 50 which comprises a plurality of resistances 15 connected in series therewith, and decimal digital rotary switches 31 and 32. Each of the wipers, 13k and 32k selectably contacts one of respective contacts of banks 31a, 31b, ... 31j or 32a, 32b, ... 32j, the wipers 31k and 32k forming an intermediate terminal of the potential divider 50. Each pair of banks 31a and 32a, 31b and 32b, ..., 31j and 32j are commonly connected to corresponding interconnecting taps of the resistances 15. The other end of the divider 50 is connected to a contact 30c and through a resistance 16 to a contact 30e. A common terminal 30d of the switch 30 is connected to the terminal 42 through a resistance 17. A contact 30f is connected to the other end of the resistance 14. Thus, in position-1 when the terminals 30a and 30d respectively make a contact with the contacts 30b and 30e, the switch 30 provides a series circuit consisting of resistances 13, 14, 15, 16 and 17, and in position-2 when the terminals 30a and 30d respectively make a contact with the contacts 30c and 30f, the switch 30 provides another series circuit consisting of resistances 13, 15 and 17, whereby the switch 30 is capable of changing the direction of the connection of the divider 50 with respect to the network.

The rotary switches 31 and 32 are formed for presetting a temperature at two digits to be detected by this device, each of which defines a respective number of the detected temperature at the first and second digits. The switches 31 and 32 of this embodiment are of the type of thumb rotary switches, each of which has the wiper 31k and 32k and ten banks, each being corresponding to a respective numbers 0, 1, 2, ..., 9.

The wipers 31k and 32k are connected through respective resistances 18 and 19 to a negative input terminal of a summing difference amplifier 45. The resistance 19 has ten times the value of the resistance 18 so that the amplifier 45 connected by a feedback resistance 20 may sum the outputs available at the wipers 31k and 32k, the output available at the wiper 31k being amplified in the amplification degree of ten times the output at the wiper 32k. The plus input terminal of the amplifier 45 is connected through a resistance 21 to a first output terminal 41 of the network, whereby the amplifier 45 amplifies the outputs from the wipers 31k and 32k on the basis that the electrical input being applied to the minus input terminal of the amplifier is a reference potential.

The intermediate terminal formed by the wipers 31k and 32k represents a second output terminal of the network. A third arm of the network is formed by the resistances between the terminal 40 and the second output terminal. When the switch 30 is in position-1, the third arm includes the resistance 13, the resistance 14, and the resistance of the resistance 15 which is formed between the banks, 31a and 32a, and the second output terminal, and the fourth arm includes the resistance 17, the resistance 16, and the resistance which is formed between the banks, 31j and 32j, and the second output terminal. For example, assuming that the wipers 31k and 32k make a contact with the banks 31a and 32a, namely the switches 31 and 32 are both set to "0", the third arm consists of the resistances 13 and 14, and the fourth arm consists of the resistances 15, 16 and 17. When the switch 30 is in position-2 and the switches 31 and 32 are both set to "0", the third arm consists of resistances 13 and 15, and the fourth arm consists of resistance 17.

The temperature detecting device in this embodiment is configured for detecting if the temperature applied to the temperature responsive resistance 11 coincides with a predetermined temperature represented by the banks which are contacted by the wipers in the divider 50. This device is capable of detecting a temperature in the range between $-99°$ C. and $+99°$ C. in units of one centigrade degree.

When a temperature to be detected is in the range between $0°$ C. and $+99°$ C., the switch 30 is turned to position-1 and the switches 31 and 32 are set into a position representing the numeral of the detected temperature. When the detected temperature is in the range between $-99°$ C. and $0°$ C., the switch 30 is set to position-2, the switch 31 and 32 are set likewise. FIG. 1 illustrates that the switch 30 is in position-1 for positive temperature detection and the switches 31 and 32 are set to 15, whereby the device of FIG. 1 is set to "$+15°$ C.".

Figure 2:
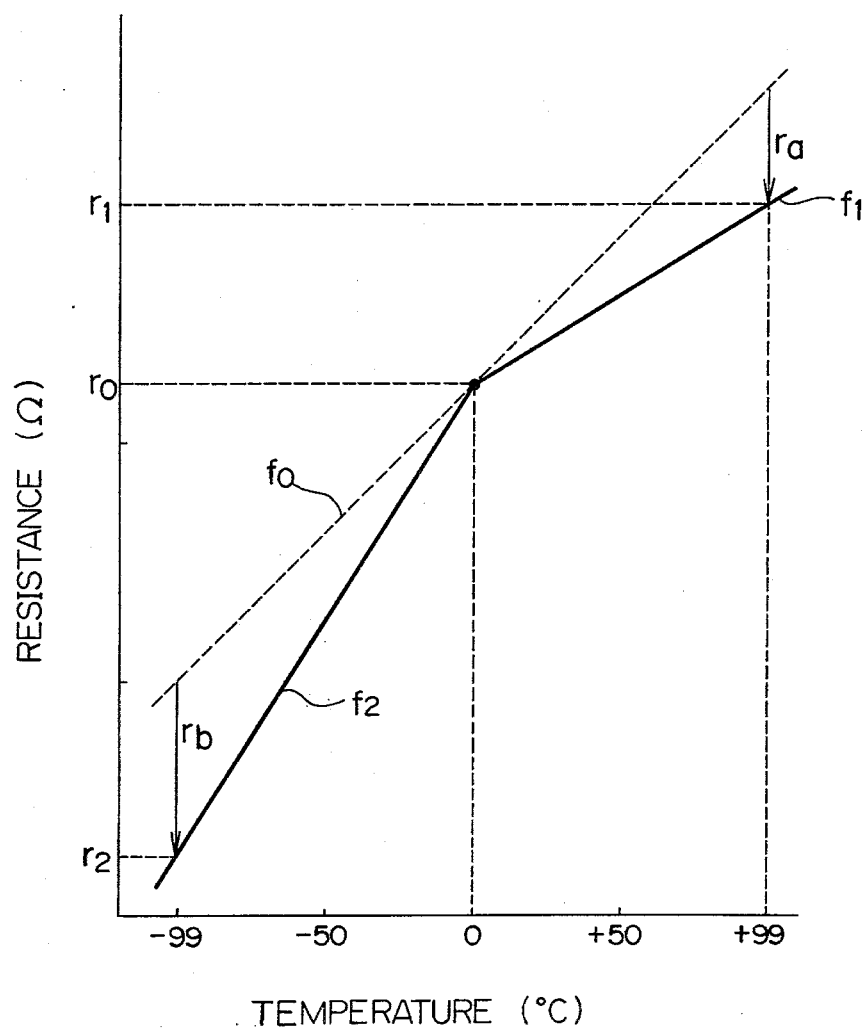
FIG. 2 is a temperature-resistance characteristic curve of a temperature responsive resistance as used in the device of FIG. 1.

FIG. 2 shows a temperature-resistance characteristic curve of the temperature responsive resistance 11 of FIG. 1, such as a platinum resistance element. A curve consisting of the solid-line curves $f_1$ and $f_2$ is an approximate characteristic curve of the platinum resistance which is a non-linear curve. A curve $f_0$ illustrates a linear curve as reference curve of the curves $f_1$ and $f_2$. The resistance element 11 has a resistance $r_0$ at $0°$ C., $r_1$ at $99°$ C., and $r_2$ at $-99°$ C.

To balance the output condition between the first and second output terminals of the network of FIG. 1, i.e., the difference output potential being zero, each resistance value of the resistances of the device of FIG. 1 is determined to satisfy the following equations:

(1)
$(R_{13}+R_{14})/(R_{13}+R_{14}+R_{15}+R_{16}+R_{17})=r_0/(r_0+R_{12})$, when the device is set to $+0°$ C.;

(2)
$(R_{13}+R_{14}+R_{15})/(R_{13}+R_{14}R_{15}+R_{16}+R_{17})=r_1/(r_1+R_{12})$, when the device is set to $+99°$ C.;

(3) $(R_{13}+R_{15})/(R_{13}+R_{15}+R_{17})=r_0/(r_0+R_{12})$, when the device is set to $-0°$ C.;

(4) $R_{13}/(R_{13}+R_{15}+R_{17})=r_2/(r_2+R_{12})$, when the device is set to $-99°$ C.;

where each symbol "R" shows a respective resistance value of the resistances corresponding to suffix numbers.

Components that may be utilized in the device of this invention and satisfy the foregoing equations are as follows. It should be noted that the particular resistance values listed are meant to be illustrative and the invention is not meant to be limited thereto:

Resistance 11(in ohms): $r_0=100.000$ $r_1=138.774$, and $r_2=59.981$,
Resistances (in ohms); $R_{12}=2.43K$; $R_{13}=60.9$; $R_{14}=45.7$; $R_{15}=39.1$; $R_{16}=121$; and $R_{17}=2.43K$ Thus, when the switches 31 and 32 are set to a two digit decimal numeral representing a predetermined temperature and the temperature at the resistance 11 has reached the predetermined temperature, the amplifier 45 provides a predetermined coincident signal. Namely, the amplifier 45 on the basis of the output at the terminal 41 sums the output at the wiper 31k as a temperature in a ten degree digit and the output at the wiper 32k as a temperature in a one degree digit.

When the device of FIG. 1 is preset to the detection temperature "$+0°$ C.", the switch 30 is set to the position-1, and the switches 31 and 32 are both set to the position "0" where the wipers 31k and 32k make a contact with the banks 31a and 32a, respectively. According to the foregoing equations (1) and (3), the potential at the second output terminal when "$+0°$ C." is set by the device is equal to the potential at the second terminal when "$-0°$ C." is set.

According to the equation (2), the variation of the potential appearing at the second output terminal between when the device is set to "$+0°$ C." and when the device is set to $+99°$ C. is equal to the variation of the potential appearing at the terminal 41 in proportion to the variation $r_a$ of the resistance 11 between $0°$ C. and $99°$ C.

According to the equation (4), the variation of the potential at the second output terminal when the device is set to "$-0°$ C." and "$-99°$ C." is equal to the variation of the potential at the first output terminal 41 in proportion to the variation $r_c$ of the resistance 11 between $-0°$ C. and $-99°$ C.

Accordingly, when the device is set to a detecting temperature from $-99°$ C. to $=99°$ C., the switch 30 has only to be set from the position-2 to the position-1, while the divider 50 keeps the switches 31 and 32 set to 99. The resistance 16 which is included in the fourth arm of the bridge network is for correcting the output potential at the second output terminal in accordance with the non-linear characteristic of the resistance 11.

Therefore, the device of FIG. 1 provides convenience of operation in that the device may be easily changed by the function of the switch 30 about the polarily of minus and plus temperature to be detected.

It is desirable to further include an indication display means in response to the position-1 or position-2 of the switch 30 for displaying a plus or minus symbol.

In this embodiments, the switch 30 may be replaced with another switching means such as a solid state switch or the like, and the divider 50 may be replaced with an analog type potential divider which includes a slidable intermediate terminal being capable of dividing the resistance of the divider as the second output terminal of the network.

The device of this embodiment also may be used for measuring a temperature applied to the temperature responsive resistance, wherein the temperature is measured by calibrating the balanced position of the intermediate terminal in the potential divider.

Alternatively, the intermediate terminals may be replaced with a greater number of intermediate terminals corresponding to the digit number of the detected temperature, for example, three switches and intermediate terminals so as to detect a temperature between −999 and +999 degrees.

While this invention has been described with reference to several preferred embodiments and variants thereof, the description is only exemplary as many modifications to the described device can be made without departing from the spirit and scope of this invention.

What is claimed is:

1. In a temperature detecting device having an electrical bridge network means including a first and a second power terminal, a first and a second output terminal, a first arm having a temperature responsive resistance connected across said first power terminal and said first output terminal, a second arm having a reference resistance connected across said first output terminal and said second power terminal, a third arm connected across said first power terminal and said second output terminal, and a fourth arm connected across said second output terminal and said second power terminal, an improvement in said electrical bridge network means comprising:

a resistance potential divider having at least one intermediate terminal which represents said second output terminal, said intermediate terminal being connected with a means for selecting a dividing point along the resistance of said divider; and, switching means connected across said first and second power terminals in series with said potential divider for inverting the connection of said potential divider in accordance with a temperature state of positive or negative about a temperature which is detected by said device;

said third and fourth arms including respective resistances which are selected by the selection of a dividing point by said selecting means.

2. A temperature detecting device according to claim 1, wherein said potential divider has a plurality of interconnecting taps which divide the resistance of said potential divider at predetermined spaced positions, each of said taps having a corresponding number of common contacts with respect to each said intermediate terminal, each said intermediate terminal being selectably connected by said selecting means to one of said common contacts.

3. A temperature detecting device according to claim 1, wherein said third or fourth arm includes a correcting resistance in series connection therewith which corrects an output potential on said second output terminal corresponding to a non-liner resistance characteristic of said temperature responsive resistance with respect to temperature.

4. A temperature detecting device according to claim 3, wherein said temperature responsive resistance is a Platinum resistance element.

5. A temperature detecting device according to claim 1 further including display means responsive to the state of said switching means for displaying a positive or negative indication.

6. A temperature detecting device according to claim 2, wherein two of said intermediate terminals and ten of said interconnecting taps are provided, each of said taps having two common contacts respectively associated with said two intermediate terminals.

7. A temperature detecting device according to claim 1, further comprising a difference summing amplifying means having first and second input terminals, said first input terminal being connected to each said intermediate terminal and said second input terminal being connected with said first output terminal.

8. A temperature detecting device according to claim 7, wherein a plurality of intermediate terminals are provided and said difference summing amplifying means includes a summing network for summing the potential appearing on said plurality of intermediate terminals in a predetermined amplification degree and for applying said sum to said first input terminal.

9. A temperature detecting device according to claim 8, wherein said intermediate terminal is connected by said selecting means to a dividing point along the resistance of said divider corresponding to a predetermined temperature, and when the temperature in said temperature responsive resistor reaches to said predetermined temperature, said amplifying means generates a coincidence signal.

* * * * *